United States Patent
Yokoyama (10) Patent No.: US 11,387,448 B2
(45) Date of Patent: Jul. 12, 2022

(54) POSITIVE ELECTRODE PLATE OF LITHIUM ION SECONDARY BATTERY, LITHIUM ION SECONDARY BATTERY, AND METHOD OF PRODUCING POSITIVE ELECTRODE PLATE OF LITHIUM ION SECONDARY BATTERY

(71) Applicant: Toyota Jidosha Kabushiki Kaisha, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/240,444

(22) Filed: Apr. 26, 2021

(65) Prior Publication Data

US 2021/0249652 A1  Aug. 12, 2021

Related U.S. Application Data (63) Continuation of application No. 16/223,788, filed on Dec. 18, 2018.

(30) Foreign Application Priority Data

Jan. 9, 2018  (JP) .............................. JP2018-001199

(51) Int. Cl.
*H01M 4/04* (2006.01)
*H01M 4/62* (2006.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
CPC .... H01M 4/366; H01M 4/525; H01M 4/1391; H01M 4/131; H01M 4/62; H01M 4/483;
(Continued)

(56) References Cited

U.S. PATENT DOCUMENTS

| | | | |
|---|---|---|---|
| 2002/0114993 A1 | 8/2002 | Miyaki et al. | |
| 2008/0118836 A1* | 5/2008 | Hwang | H01M 4/621 429/219 |

(Continued)

FOREIGN PATENT DOCUMENTS

| | | |
|---|---|---|
| CN | 102881861 A | 1/2013 |
| CN | 106030863 A | 10/2016 |

(Continued)

OTHER PUBLICATIONS

Machine translation of JP-3622383-B2 (Year: 2005).*

(Continued)

*Primary Examiner* — Eugenia Wang
(74) *Attorney, Agent, or Firm* — Dinsmore & Shohl LLP (57) ABSTRACT

A positive electrode plate of a lithium ion secondary battery includes a current collector foil, an active material layer including positive electrode active material particles containing lithium oxide on the current collector foil, and a protective conductive layer that does not include the positive electrode active material particles and includes a conductive material and a binding agent on the active material layer.

4 Claims, 8 Drawing Sheets

(51) Int. Cl.
  *H01M 4/1391* (2010.01)
  *H01M 4/525* (2010.01)
  *H01M 4/36* (2006.01)
  *H01M 10/0525* (2010.01)
  *H01M 4/48* (2010.01)
  *H01M 4/139* (2010.01)
  *H01M 4/131* (2010.01)
  *H01M 4/02* (2006.01)

(52) U.S. Cl.
  CPC .......... *H01M 4/131* (2013.01); *H01M 4/139* (2013.01); *H01M 4/1391* (2013.01); *H01M 4/483* (2013.01); *H01M 4/525* (2013.01); *H01M 4/62* (2013.01); *H01M 4/628* (2013.01); *H01M 10/0525* (2013.01); *H01M 2004/028* (2013.01)

(58) Field of Classification Search
  CPC .... H01M 4/0471; H01M 4/139; H01M 4/628; H01M 4/0404; H01M 2004/028
  See application file for complete search history.

(56) References Cited

U.S. PATENT DOCUMENTS

| | | | |
|---|---|---|---|
| 2012/0107682 A1 | 5/2012 | Imachi et al. | |
| 2014/0178747 A1 | 6/2014 | Tsai et al. | |
| 2015/0214552 A1 | 7/2015 | Cho et al. | |
| 2016/0308192 A1* | 10/2016 | Lee | H01M 4/131 |
| 2016/0315351 A1 | 10/2016 | Kotou et al. | |
| 2016/0351902 A1 | 12/2016 | Hamanaka | |
| 2017/0025658 A1 | 1/2017 | Shi et al. | |
| 2017/0033399 A1 | 2/2017 | Fujisawa et al. | |
| 2017/0133685 A1 | 5/2017 | Chae et al. | |
| 2017/0309911 A1 | 10/2017 | Ryoshi et al. | |
| 2018/0083269 A1* | 3/2018 | Iwasaki | H01M 4/5825 |

FOREIGN PATENT DOCUMENTS

| | | | |
|---|---|---|---|
| CN | 106848379 A | | 6/2017 |
| CN | 107112580 A | | 8/2017 |
| CN | 107845768 A | | 3/2018 |
| JP | 3622383 B2 | * | 2/2005 |
| JP | 2007-258086 A | | 10/2007 |
| JP | 2008-103345 A | | 5/2008 |
| JP | 2012-094383 A | | 5/2012 |
| JP | 2013-179063 A | | 9/2013 |
| JP | 2014-179206 A | | 9/2014 |
| JP | 2015-156290 A | | 8/2015 |
| JP | 2016-088776 A | | 5/2016 |
| JP | 2016-109872 A | | 6/2016 |
| WO | 2011/054441 A1 | | 5/2011 |
| WO | 2015156062 A1 | | 10/2015 |

OTHER PUBLICATIONS

Office Action dated May 18, 2021 in U.S. Appl. No. 16/223,788.
U.S. Appl. No. 16/223,788, filed Dec. 18, 2018, Tomohiro Yokoyama.
Office Action Issued to U.S. Appl. No. 16/223,788 dated Nov. 12, 2021.
The Energy Saving and New Energy Vehicle Yearbook 2014, the China Automotive Technology and Research Center et al., Economic Press China, Dec. 2014, p. 29.

* cited by examiner

FIG. 8

POSITIVE ELECTRODE PLATE OF LITHIUM ION SECONDARY BATTERY, LITHIUM ION SECONDARY BATTERY, AND METHOD OF PRODUCING POSITIVE ELECTRODE PLATE OF LITHIUM ION SECONDARY BATTERY

CROSS-REFERENCE TO RELATED APPLICATIONS

This application is a continuation of U.S. patent application Ser. No. 16/223,788 filed on Dec. 18, 2018, which claims priority to Japanese Patent Application No. 2018-001199 filed on Jan. 9, 2018, both of which are incorporated herein by reference in their entirety including the specification, drawings, and abstract.

BACKGROUND

1. Technical Field

The present disclosure relates to a positive electrode plate of a lithium ion secondary battery in which an active material layer is provided on a current collector foil, a lithium ion secondary battery including the positive electrode plate, and a method of producing a positive electrode plate.

2. Description of Related Art

As a positive electrode plate used for a lithium ion secondary battery (hereinafter simply referred to as a "battery"), a positive electrode plate in which an active material layer containing positive electrode active material particles made of lithium oxide is formed on a current collector foil is known. In addition, as positive electrode active material particles made of lithium oxide, lithium nickel cobalt aluminum composite oxide particles, lithium nickel cobalt manganese composite oxide particles, olivine type iron phosphate lithium particles, spinel type lithium manganese oxide particles, and the like are known. For example, in Japanese Unexamined Patent Application Publication No. 2016-88776 (JP 2016-88776 A), as positive electrode active material particles, lithium nickel cobalt aluminum composite oxide particles are disclosed (refer to the scope of claims of JP 2016-88776 A).

SUMMARY

However, when positive electrode active material particles made of lithium oxide are in contact with moisture in the atmosphere, surfaces of the particles react with water ($H_2O$) and lithium hydroxide (LiOH) is generated ($Li_2O+H_2O \rightarrow 2LiOH$). Further, the lithium hydroxide reacts with carbon dioxide ($CO_2$) in the atmosphere and lithium carbonate ($Li_2CO_3$) is generated ($2LiOH+CO_2 \rightarrow Li_2CO_3+H_2O$). Lithium carbonate generated on particle surfaces of positive electrode active material particles is a resistor. In addition, when positive electrode active material particles react with water and lithium ions are released from positive electrode active material particles, a crystal structure of positive electrode active material particles changes and insertion and removal of lithium ions in positive electrode active material particles become difficult. Therefore, in a battery using the positive electrode plate, an IV resistance becomes higher.

The present disclosure provides a positive electrode plate of a lithium ion secondary battery that can reduce an increase in an IV resistance of a battery when the battery is formed due to contact with moisture and carbon dioxide in the atmosphere, a lithium ion secondary battery using the positive electrode plate, and a method of producing a positive electrode plate of a lithium ion secondary battery.

A first aspect of the present disclosure is a positive electrode plate of a lithium ion secondary battery, including a current collector foil; an active material layer including positive electrode active material particles containing lithium oxide on the current collector foil; and a protective conductive layer that does not include the positive electrode active material particles and includes a conductive material and a binding agent on the active material layer.

In the positive electrode plate of the lithium ion secondary battery, since the protective conductive layer is provided on the active material layer, moisture and carbon dioxide in the atmosphere are unlikely to come in contact with positive electrode active material particles in the active material layer when the positive electrode plate is handled. Therefore, it is possible to reduce generation of lithium hydroxide on particle surfaces of the positive electrode active material particles in the active material layer, and additionally, generation of lithium carbonate due to contact with moisture and carbon dioxide, and change in a crystal structure on particle surfaces. Therefore, in the battery using the positive electrode plate, compared to a battery using a positive electrode plate having no protective conductive layer on an active material layer, a positive electrode plate in which an IV resistance of the battery is reduced can be obtained. Moreover, since the conductive material is included in the protective conductive layer, compared to a positive electrode plate in which the conductive material is not included in the protective conductive layer, the conductivity of the positive electrode plate in the thickness direction can be improved.

In the first aspect, the protective conductive layer may include a moisture absorbent.

In the positive electrode plate, since the protective conductive layer includes a moisture absorbent, even if the positive electrode plate comes in contact with moisture in the atmosphere, the moisture is absorbed by the moisture absorbent included in the protective conductive layer. Therefore, it is possible to reduce the amount of moisture that reaches the active material layer below the protective conductive layer. Therefore, it is possible to effectively reduce generation of lithium hydroxide on particle surfaces, and additionally, generation of lithium carbonate due to moisture in contact with positive electrode active material particles in the active material layer, and change in a crystal structure on particle surfaces. Therefore, compared to a battery using a positive electrode plate in which no moisture absorbent is included in a protective conductive layer, a positive electrode plate in which an IV resistance of the battery is further reduced can be obtained.

Here, examples of the "moisture absorbent" include, for example, silica gel, gypsum, zeolite such as Molecular Sieve (registered trademark) (MS), and aluminum oxide, boehmite, oxidized calcium, calcium chloride, and diphosphorus pentoxide powders.

In the first aspect, the moisture absorbent may be a chemical moisture absorbent that adsorbs water through a chemical reaction.

In the positive electrode plate, when the moisture absorbent is a chemical moisture absorbent, it adsorbs moisture more easily than with a physical moisture absorbent (for example, zeolite, aluminum oxide, and boehmite powders)

that adsorbs water physically. Therefore, it is possible to effectively reduce the amount of moisture that reaches the active material layer below the protective conductive layer when the positive electrode plate comes in contact with moisture in the atmosphere. Therefore, a positive electrode plate in which an IV resistance of the battery is more effectively reduced can be obtained.

Here, examples of the "chemical moisture absorbent" include silica gel, gypsum, oxidized calcium, calcium chloride, and diphosphorus pentoxide powders. Since gypsum is inexpensive and easily handled, it is used as a chemical moisture absorbent in some embodiments. Here, silica gel not only adsorbs water physically but also adsorbs water chemically using silanol groups. Thus, in the present disclosure, the chemical moisture absorbent described above is included.

In the first aspect, the moisture absorbent may be an anhydrite powder.

In the first aspect, the positive electrode active material particles included in the active material layer may have a property in which a pH of a liquid dispersion in which 1 g of the positive electrode active material particles is dispersed in 49 g of water is 11.3 or more.

In the positive electrode plate, as the positive electrode active material particles made of lithium oxide, positive electrode active material particles having a property in which a pH of a liquid dispersion is 11.3 or more is used. Such positive electrode active material particles react with particularly water and carbon dioxide, easily generate lithium hydroxide, and additionally, lithium carbonate, and an IV resistance is likely to be higher in a battery using the positive electrode plate. In some embodiments, the protective conductive layer is provided on the active material layer and moisture and carbon dioxide in the atmosphere do not come in contact with the positive electrode active material particles.

In the first aspect, a layer thickness t2 of the protective conductive layer may be thinner than a layer thickness t1 of the active material layer (t2<t1).

In the first aspect, the layer thickness of the protective conductive layer may be 2 μm or more.

In the positive electrode plate, since the layer thickness t2 of the protective conductive layer is thinner than the layer thickness t1 of the active material layer, compared to when the layer thickness t2 of the protective conductive layer is thicker than the layer thickness t1 of the active material layer, it is possible to reduce a decrease in a battery capacity (battery capacity per unit thickness of the positive electrode plate) according to the provision of the protective conductive layer.

However, when the layer thickness t2 of the protective conductive layer is too thin, the active material layer is easily partially exposed. When the active material layer is partially exposed, moisture and carbon dioxide in the atmosphere easily come in contact with the positive electrode active material particles in the active material layer. In some embodiments, the layer thickness t2 of the protective conductive layer is 2 μm or more.

A second aspect of the present disclosure is a lithium ion secondary battery, including the positive electrode plate according to the first aspect and a negative electrode plate.

In a positive electrode plate using the lithium ion secondary battery, a protective conductive layer is provided on an active material layer. Therefore, in the battery, compared to a battery using a positive electrode plate having no protective conductive layer on an active material layer, it is possible to reduce an IV resistance of the battery as described above.

A third aspect of the present disclosure is a method of producing a positive electrode plate of a lithium ion secondary battery, including forming an undried active material layer including positive electrode active material particles containing lithium oxide on a current collector foil (first undried layer forming process), forming an undried protective conductive layer that does not include positive electrode active material particles and includes a conductive material and a binding agent on the undried active material layer (second undried layer forming process), and drying the undried active material layer and the undried protective conductive layer simultaneously and forming the active material layer and the protective conductive layer (simultaneous drying process).

As a method of producing a positive electrode plate, for example, a method in which an undried active material layer is formed and then dried to form an active material layer, and then an undried protective conductive layer is formed on the active material layer and dried to form a protective conductive layer may be conceived. However, in this method, not only in a process of forming the active material layer and then forming the undried protective conductive layer thereon, but also in a process of drying the undried active material layer with hot air and forming the active material layer, positive electrode active material particles come in contact with moisture and carbon dioxide in the atmosphere. Therefore, generation of lithium hydroxide and additionally lithium carbonate on particle surfaces of the positive electrode active material particles occur and change in a crystal structure on particle surfaces may occur. As a result, an IV resistance is higher in a battery using the positive electrode plate.

On the other hand, this method of producing a positive electrode plate includes the first undried layer forming process, the second undried layer forming process and the simultaneous drying process. Before the undried active material layer is dried, since the undried protective conductive layer is formed on the undried active material layer, it is possible to reduce contact of the positive electrode active material particles in the undried active material layer with moisture and carbon dioxide in the atmosphere in the drying process. Therefore, it is possible to reduce generation of lithium hydroxide and additionally, lithium carbonate on particle surfaces of the positive electrode active material particles, and change in a crystal structure on particle surfaces. Therefore, in a battery using the positive electrode plate, compared to a battery using the positive electrode plate produced according to the above production method, it is possible to reduce an IV resistance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment 1

Figure 1:
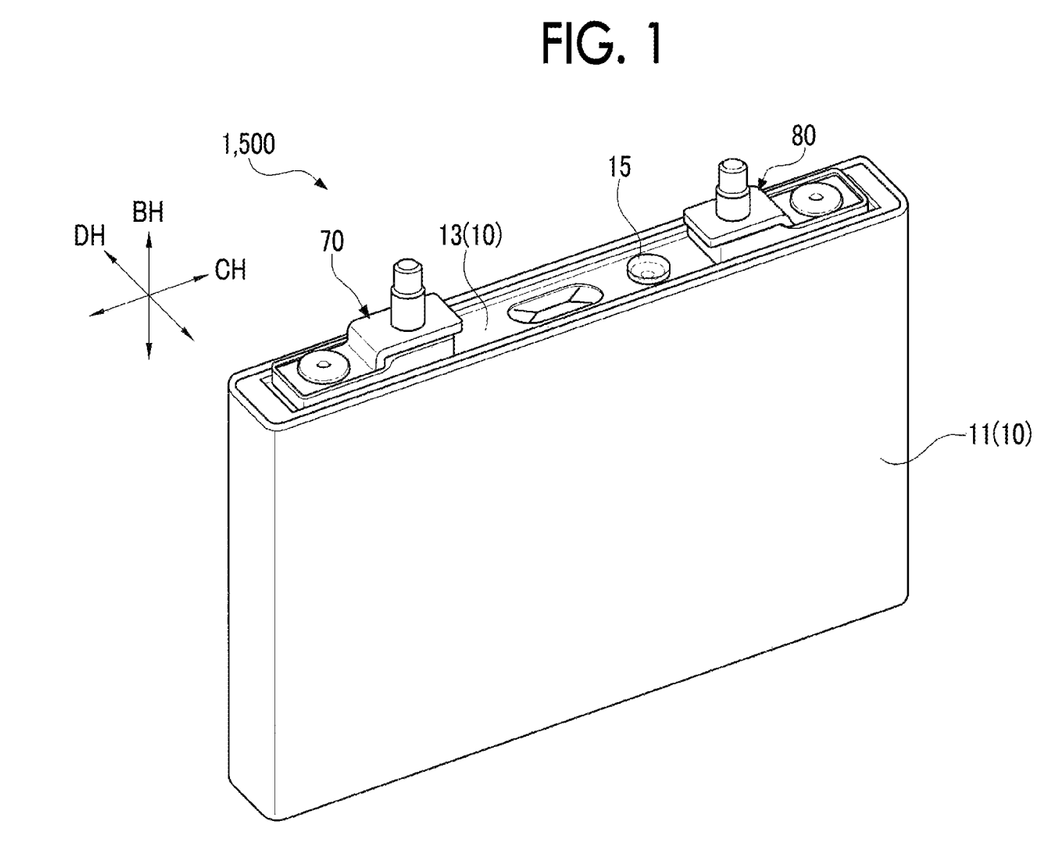
FIG. 1 is a perspective view of a battery according to Embodiments 1 and 2.
Figure 2:
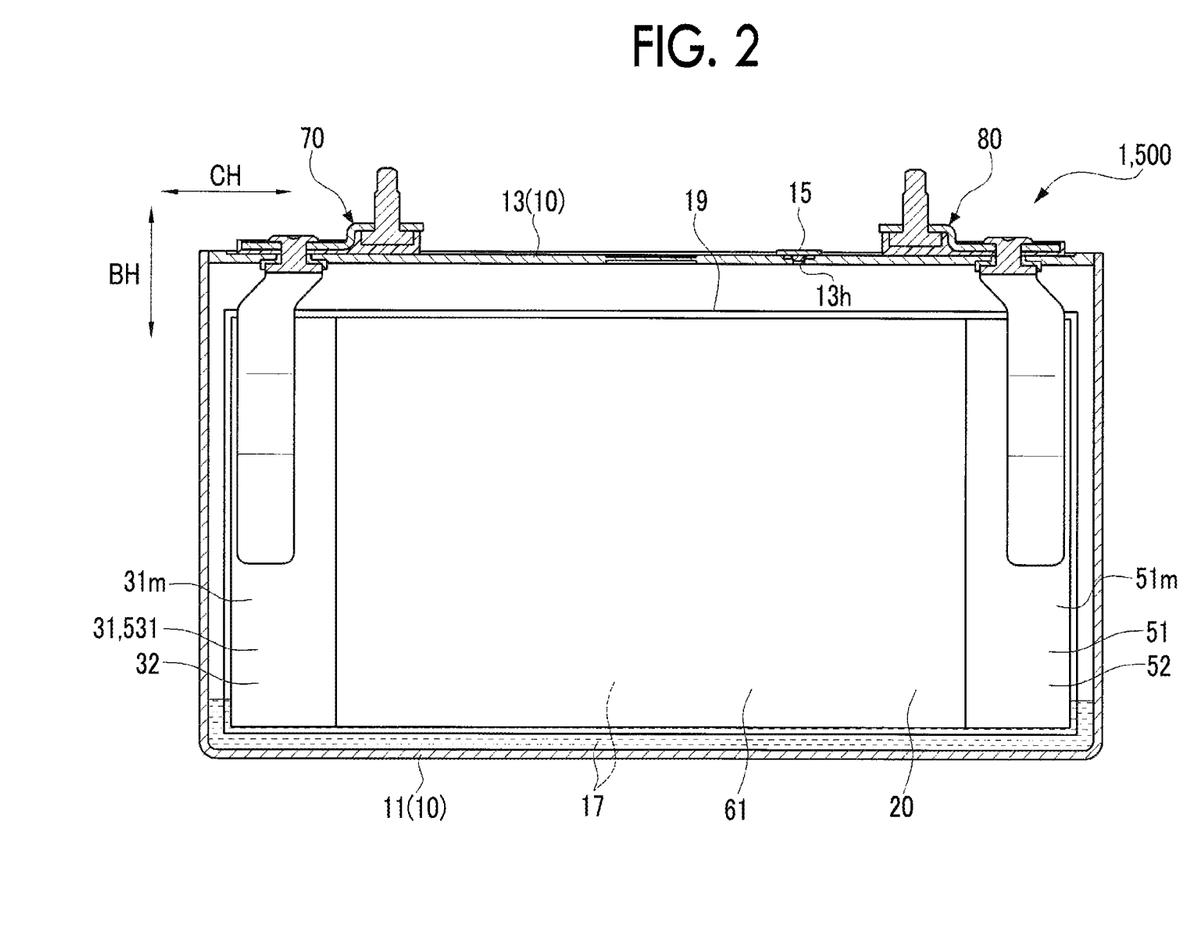
FIG. 2 is a cross-sectional view of the battery according to Embodiments 1 and 2.
Figure 3:
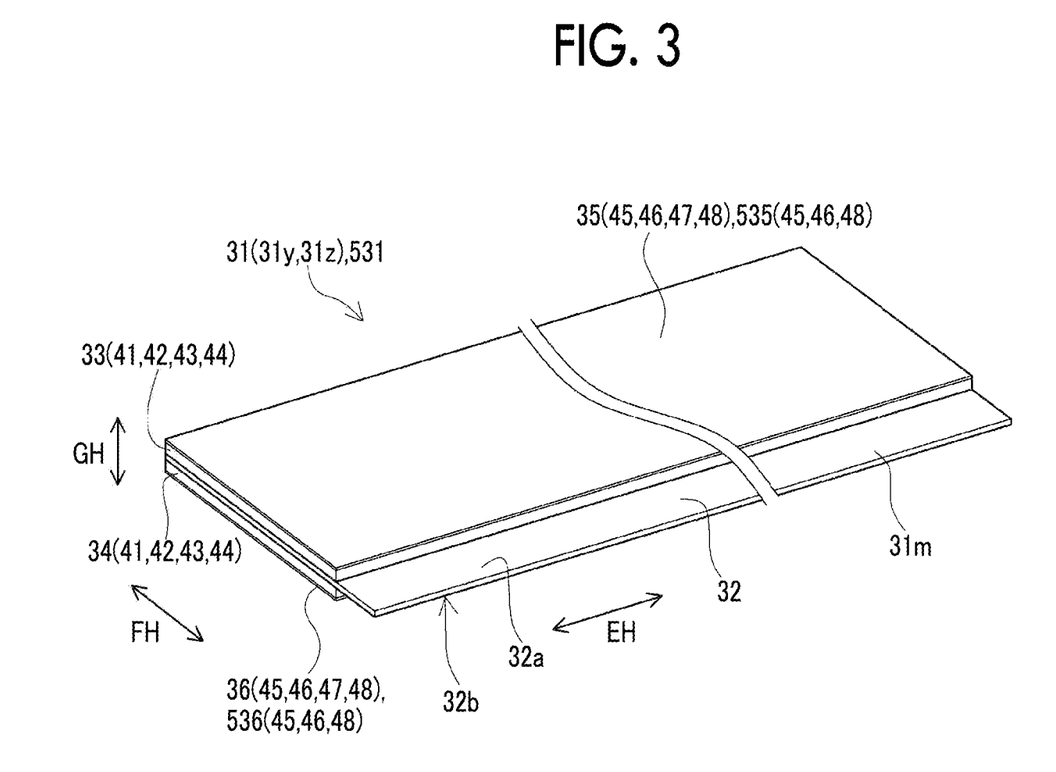
FIG. 3 is a perspective view of a positive electrode plate according to Embodiments 1 and 2.
Figure 4:
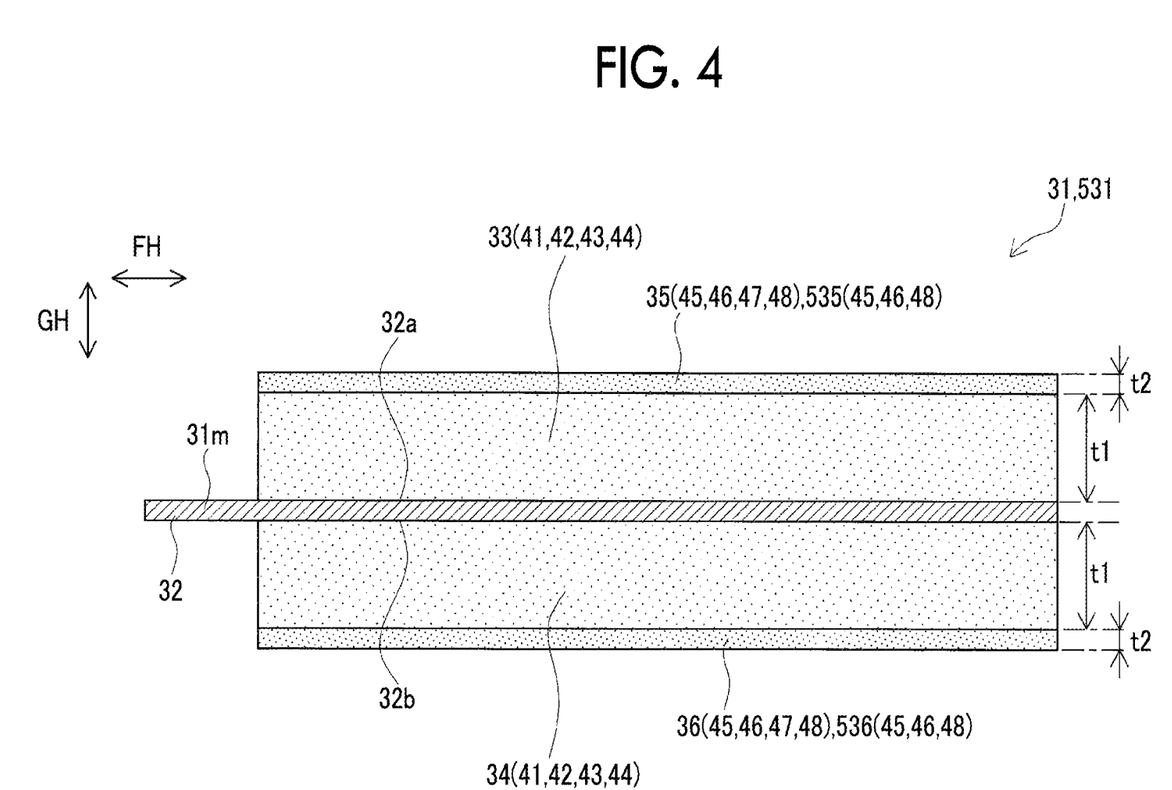
FIG. 4 is a cross-sectional view of the positive electrode plate according to Embodiments 1 and 2.

A first embodiment of the present disclosure will be described below with reference to the drawings. FIG. 1 and FIG. 2 show a perspective view and a cross-sectional view of a lithium ion secondary battery (hereinafter simply referred to as a "battery") 1 according to Embodiment 1. In addition, FIG. 3 and FIG. 4 show a perspective view and a cross-sectional view of a positive electrode plate 31 of the battery 1. Here, in the following description, a battery longitudinal direction BH, a battery transverse direction CH and a battery thickness direction DH in the battery 1 will be defined as the directions shown in FIG. 1 and FIG. 2. In addition, in the following description, a longitudinal direction EH, a width direction FH and a thickness direction GH in the positive electrode plate 31 will be defined as the directions shown in FIG. 3 and FIG. 4.

The battery 1 is a rectangular and closed type lithium ion secondary battery mounted on a vehicle such as a hybrid vehicle and a plug-in hybrid vehicle, and an electric vehicle. The battery 1 includes a battery case 10, an electrode body 20 accommodated therein, a positive electrode terminal member 70 and a negative electrode terminal member 80 supported by the battery case 10, and the like. In addition, an electrolytic solution 17 is accommodated in the battery case 10 and a part thereof is impregnated in the electrode body 20. The electrolytic solution 17 includes lithium hexafluorophosphate ($LiPF_6$) as a solute.

Of these, the battery case 10 has a rectangular parallelepiped box shape and is made of a metal (in Embodiment 1, aluminum). The battery case 10 includes a case main body member 11 having a bottomed rectangular tubular shape of which only an upper side is open and a rectangular plate-like case lid member 13 welded to allow closing of an opening of the case main body member 11. In the case lid member 13, the positive electrode terminal member 70 made of aluminum is fixed and insulated from the case lid member 13. The positive electrode terminal member 70 is connected to and conducts electricity with a positive electrode exposed part 31m of the positive electrode plate 31 of the electrode body 20 in the battery case 10, and extends to the outside of the battery through the case lid member 13. In addition, in the case lid member 13, the negative electrode terminal member 80 made of copper is fixed and is insulated from the case lid member 13. The negative electrode terminal member 80 is connected to and conducts electricity with a negative electrode exposed part 51m of a negative electrode plate 51 of the electrode body 20 in the battery case 10, and extends to the outside of the battery through the case lid member 13.

The electrode body 20 has a flat shape and is accommodated in the battery case 10 in a horizontal state. A bag-shaped insulation film enclosure 19 made of an insulation film is disposed between the electrode body 20 and the battery case 10. In the electrode body 20, the belt-like positive electrode plate 31 and the belt-like negative electrode plate 51 are laminated with a pair of separators 61 and 61 made of a belt-like resin porous member therebetween and wound in a flat shape around an axis.

The positive electrode plate 31 (refer to FIG. 3 and FIG. 4) has a positive electrode current collector foil 32 made of a belt-like aluminum foil. Within one main surface 32a of the positive electrode current collector foil 32, on an area which is a part of the positive electrode plate 31 in the width direction FH and extends in the longitudinal direction EH, an active material layer 33 with a layer thickness t1=60 μm is formed in a belt shape. In addition, within the other main surface 32b of the positive electrode current collector foil 32, on an area which is a part of the positive electrode plate 31 in the width direction FH and extends in the longitudinal direction EH, similarly, an active material layer 34 with a layer thickness t1=60 μm is formed in a belt shape.

These active material layers 33 and 34 include positive electrode active material particles 41 made of lithium composite oxide, a conductive material 42, a binding agent 43 and a dispersant 44. In Embodiment 1, as the positive electrode active material particles 41 made of lithium composite oxide, lithium nickel cobalt aluminum composite oxide particles having a layered rock salt structure, specifically, $Li_{1.02}(Ni_{0.82}Co_{0.14}Al_{0.04})O_2$ particles having an average particle size of 11 μm are used. The positive electrode active material particles 41 have a property in which a pH of a liquid dispersion in which 1 g of the positive electrode active material particles 41 is dispersed in 49 g of water becomes pH=11.3 or more (in Embodiment 1, pH=11.6). In addition, in Embodiment 1, acetylene black (AB) is used as the conductive material 42, polyvinylidene fluoride (PVDF) is used as the binding agent 43, and an anionic dispersant is used as the dispersant 44. A formulation ratio by weight between the positive electrode active material particles 41, the conductive material 42, the binding agent 43, and the dispersant 44 is 92:6:1:1.

In addition, on one active material layer 33, over its entire surface, a protective conductive layer 35 having a layer thickness t2 that is thinner than the layer thickness t1=60 μm of the active material layer 33 (t2<t1) and having a layer thickness of 2 μm or more (t2=6 μm) is formed. In addition, on the other active material layer 34, over its entire surface, a protective conductive layer 36 having a layer thickness t2 that is thinner than the layer thickness t1=60 μm of the active material layer 34 (t2<t1), and having a layer thickness of 2 μm or more (t2=6 μm) is formed. These protective conductive layers 35 and 36 do not include positive electrode active material particles, and include a conductive material 45, a binding agent 46, a moisture absorbent 47, and a dispersant 48.

In Embodiment 1, as the moisture absorbent 47, a chemical moisture absorbent that adsorbs water according to a chemical reaction, specifically, an anhydrite powder, is used. In addition, AB is used as the conductive material 45 like the conductive material 42 of the active material layers 33 and 34, PVDF is used as the binding agent 46 like the binding agent 43 of the active material layers 33 and 34, and an anionic dispersant is used as the dispersant 48 like the dispersant 44 of the active material layers 33 and 34. A formulation ratio by weight between the conductive material 45, the binding agent 46, the moisture absorbent 47, and the dispersant 48 is 30:6:64:1.

Here, one end of the positive electrode plate 31 in the width direction FH forms the positive electrode exposed part 31$m$ in which the positive electrode current collector foil 32 is exposed in the thickness direction GH without the active material layers 33 and 34 and the protective conductive layers 35 and 36 in the thickness direction GH. The positive electrode terminal member 70 is welded to the positive electrode exposed part 31$m$.

The negative electrode plate 51 has a belt-like negative electrode current collector foil 52 made of copper foil. Within one main surface of the negative electrode current collector foil 52, on an area which is a part of the negative electrode plate 51 in the width direction and extends in the longitudinal direction, a negative electrode active material layer (not shown) is formed in a belt shape. In addition, within the other main surface of the negative electrode current collector foil 52, on an area which is a part of the negative electrode plate 51 in the width direction and extends in the longitudinal direction, a negative electrode active material layer (not shown) is formed in a belt shape. These negative electrode active material layers include negative electrode active material particles, a binding agent and a thickener. In Embodiment 1, graphite particles are used as the negative electrode active material particles, styrene butadiene rubber (SBR) is used as the binding agent, and carboxymethyl cellulose (CMC) is used as the thickener.

As described above, in the positive electrode plate 31 of the battery 1, since the protective conductive layers 35 and 36 are provided on the active material layers 33 and 34, moisture and carbon dioxide in the atmosphere are unlikely to come in contact with the positive electrode active material particles 41 in the active material layers 33 and 34 when the positive electrode plate 31 is handled. Therefore, it is possible to reduce generation of lithium hydroxide on particle surfaces of the positive electrode active material particles 41 in the active material layers 33 and 34, and additionally, generation of lithium carbonate due to contact with moisture and carbon dioxide and change in a crystal structure on particle surfaces. Therefore, in the battery 1 using the positive electrode plate 31, compared to a battery using a positive electrode plate having no protective conductive layers 35 and 36 on the active material layers 33 and 34, the positive electrode plate 31 in which an IV resistance of the battery 1 is reduced can be obtained. Moreover, since the conductive material 45 is included in the protective conductive layers 35 and 36, compared to a positive electrode plate in which the conductive material 45 is not included in the protective conductive layers 35 and 36, the conductivity of the positive electrode plate 31 in the thickness direction GH can be improved.

In addition, in the positive electrode plate 31 of Embodiment 1, since the protective conductive layers 35 and 36 include the moisture absorbent 47, even if the positive electrode plate 31 comes in contact with moisture in the atmosphere, the moisture is absorbed by the moisture absorbent 47 included in the protective conductive layers 35 and 36. Therefore, it is possible to reduce the amount of moisture that reaches the active material layers 33 and 34 below the protective conductive layers 35 and 36. Therefore, it is possible to effectively reduce generation of lithium hydroxide on particle surfaces, and additionally, generation of lithium carbonate, due to moisture in contact with the positive electrode active material particles 41 in the active material layers 33 and 34, and change in a crystal structure on particle surfaces. Therefore, compared to a battery using a positive electrode plate in which the moisture absorbent 47 is not included in the protective conductive layers 35 and 36, the positive electrode plate 31 in which an IV resistance of the battery 1 is further reduced can be obtained. In particular, in this embodiment, since the moisture absorbent 47 is a chemical moisture absorbent (in Embodiment 1, gypsum), moisture is more easily adsorbed than with a physical moisture absorbent. Therefore, the positive electrode plate 31 in which an IV resistance of the battery 1 is more effectively reduced can be obtained.

In addition, in the positive electrode plate 31 of Embodiment 1, as the positive electrode active material particles 41 made of lithium oxide, positive electrode active material particles having a property in which the liquid dispersion has a pH of 11.3 or more are used. Such positive electrode active material particles 41 react with particularly water and carbon dioxide, easily generate lithium hydroxide, and additionally, lithium carbonate, and an IV resistance is likely to be higher in the battery 1 using the positive electrode plate 31. In some embodiments, the protective conductive layers 35 and 36 are provided on the active material layers 33 and 34 and moisture and carbon dioxide in the atmosphere do not come in contact with the positive electrode active material particles 41.

In addition, in the positive electrode plate 31 of Embodiment 1, since the layer thickness t2 of the protective conductive layers 35 and 36 is thinner than the layer thickness t1 of the active material layers 33 and 34 (t2<t1), compared to when the layer thickness t2 of the protective conductive layers 35 and 36 is thicker than the layer thickness t1 of the active material layers 33 and 34, it is possible to reduce a decrease in a battery capacity (battery capacity per unit thickness of the positive electrode plate 31) according to the provision of the protective conductive layers 35 and 36. On the other hand, since the layer thickness t2 of the protective conductive layers 35 and 36 is set to 2 μm or more (in Embodiment 1, t2=6 μm), it is possible to prevent the active material layers 33 and 34 from being partially exposed (the entire surfaces of the active material layers 33 and 34 can be covered with the protective conductive layers 35 and 36).

In addition, in the positive electrode plate 31 used for the battery 1 of Embodiment 1, the protective conductive layers 35 and 36 are provided on the active material layers 33 and 34. Therefore, in the battery 1, compared to a battery using a positive electrode plate having no protective conductive layers 35 and 36 on the active material layers 33 and 34, it is possible to reduce an IV resistance of the battery 1 as described above.

Figure 5:
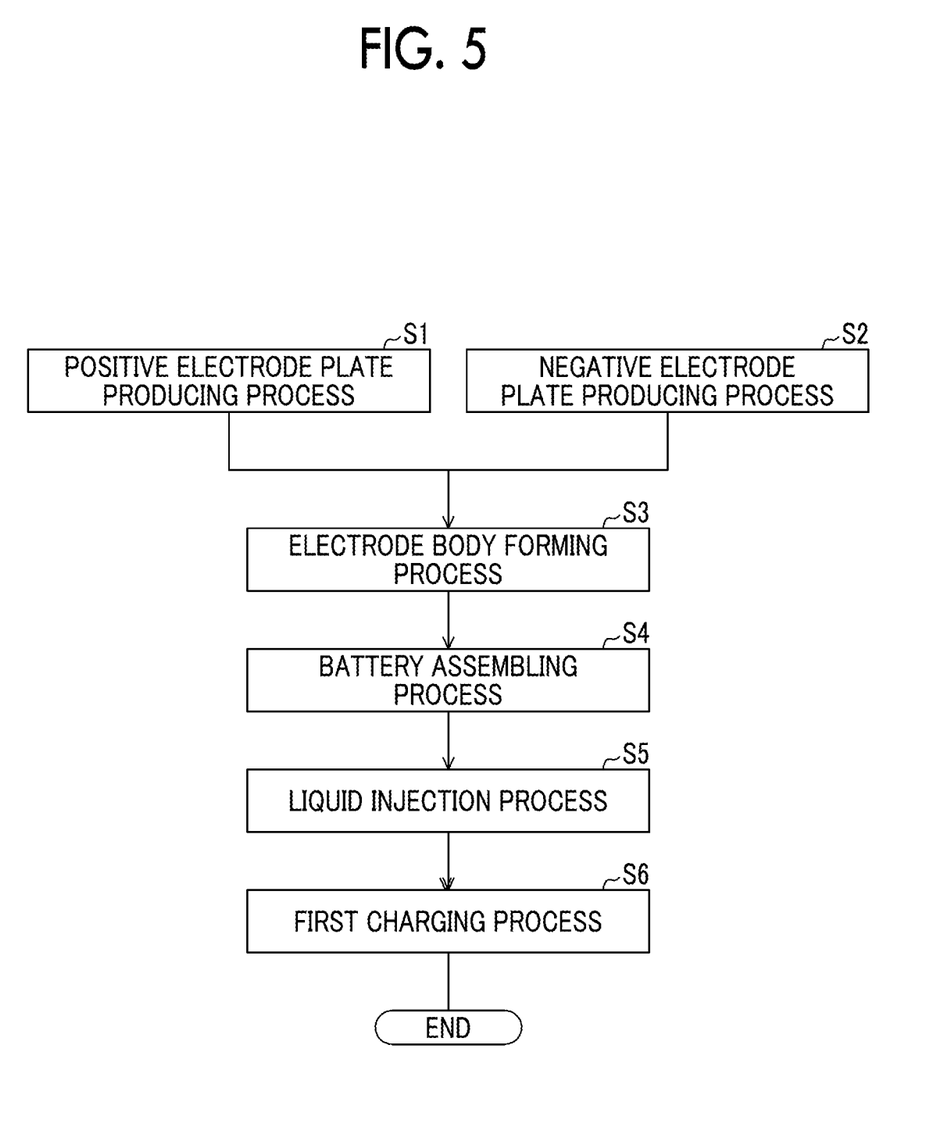
FIG. 5 is a flowchart of a method of producing the battery according to Embodiments 1 and 2.

Next, a method of producing the battery 1 including a method of producing the positive electrode plate 31 will be described (refer to FIG. 5 to FIG. 7). Here, in Embodiment 1, processes of a "positive electrode plate producing process S1" and a "negative electrode plate producing process S2" to a "battery assembling process S4" are performed under environments of 25° C., a humidity of 60%, and a dew point (DP) temperature of 16° C. First, the "positive electrode plate producing process S1" is performed to produce the positive electrode plate 31. A first paste DP1 used for forming the active material layers 33 and 34 and a second paste DP2 used for forming the protective conductive layers 35 and 36 are prepared in advance.

Specifically, the positive electrode active material particles 41 made of lithium composite oxide (in Embodiment 1, lithium nickel cobalt aluminum composite oxide), the conductive material 42 (in Embodiment 1, AB), the binding agent 43 (in Embodiment 1, PVDF) and the dispersant 44 (in Embodiment 1, an anionic dispersant) are kneaded together with a dispersion medium (in Embodiment 1, N-methyl-2-pyrrolidone (NMP)), and thereby the first paste DP1 is obtained. A formulation ratio by weight between the positive electrode active material particles 41, the conductive material 42, the binding agent 43, and the dispersant 44 is 92:6:1:1. In addition, a solid fraction NV of the first paste DP1 is set to 70 wt % (a proportion of NMP is 30 wt %).

In addition, the conductive material 45 (in Embodiment 1, AB), the binding agent 46 (in Embodiment 1, PVDF), the moisture absorbent 47 (in Embodiment 1, anhydrite powder) and the dispersant 48 (in Embodiment 1, an anionic dispersant) are kneaded together with a dispersion medium (in Embodiment 1, NMP), and thereby the second paste DP2 is obtained. A formulation ratio by weight between the conductive material 45, the binding agent 46, the moisture absorbent 47, and the dispersant 48 is 30:6:64:1. In addition, a solid fraction NV of the second paste DP2 is set to 25 wt % (a proportion of NMP is 75 wt %).

Figure 6:
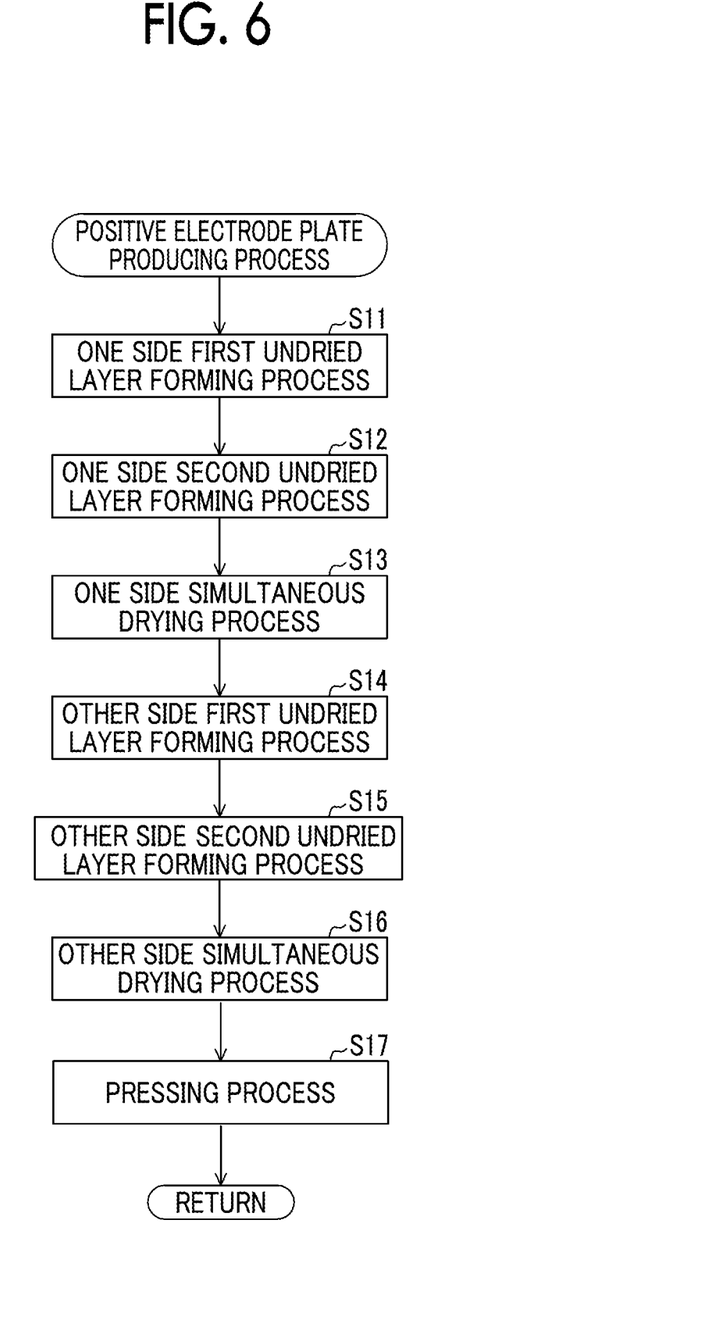
FIG. 6 is a flowchart of a positive electrode plate producing process subroutine according to Embodiments 1 and 2.
Figure 7:
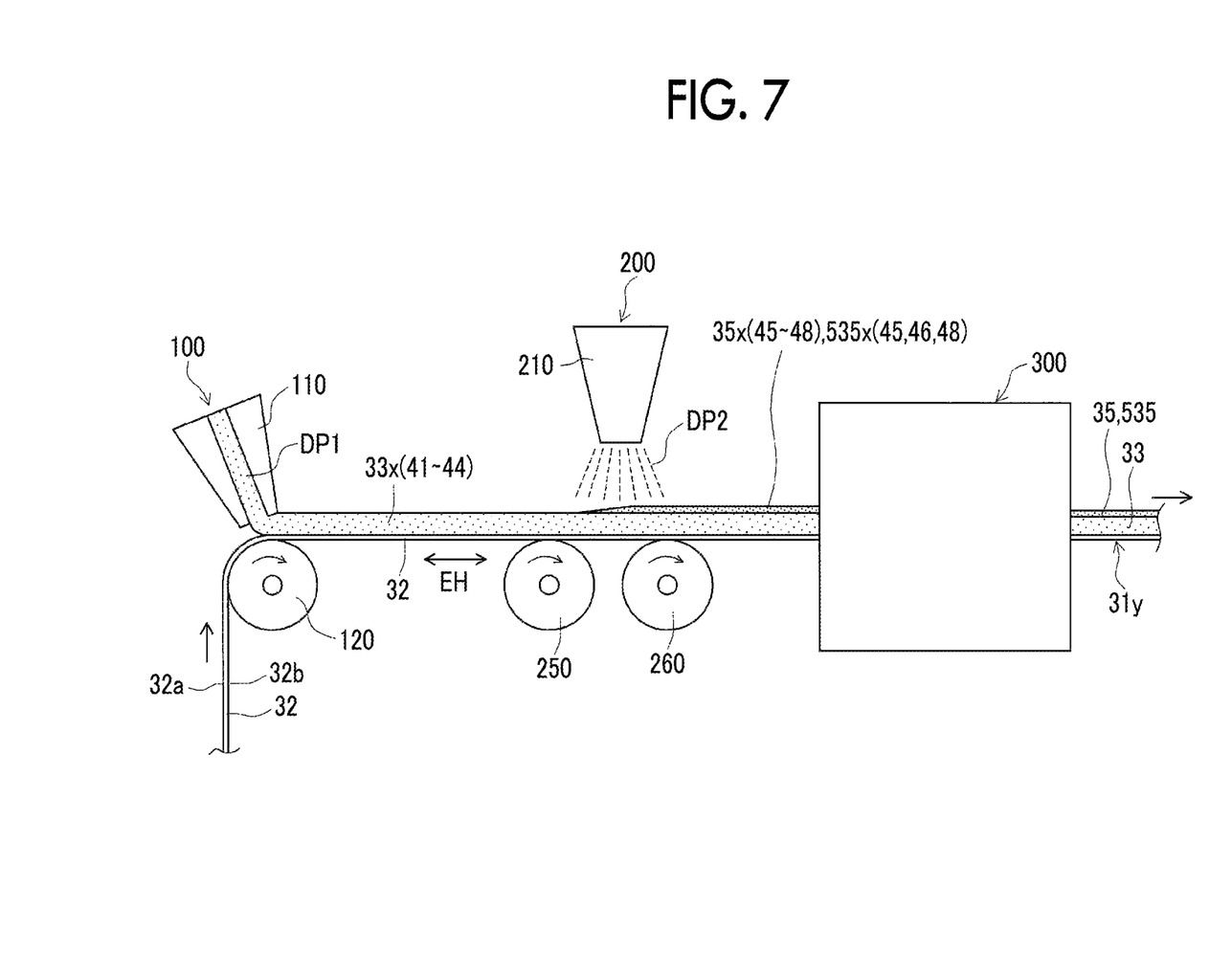
FIG. 7 is an explanatory diagram showing a method of producing the positive electrode plate according to Embodiments 1 and 2.

Then, among subroutines of the positive electrode plate producing process S1 shown in FIG. 6, in "one side first undried layer forming process S11," using a die coating device 100 (refer to FIG. 7), the first paste DP1 is applied to one main surface 32a of the positive electrode current collector foil 32 and an undried active material layer 33x is formed. The die coating device 100 includes a coating die 110 for applying the first paste DP1 to the positive electrode current collector foil 32, a backup roller 120 for transporting the positive electrode current collector foil 32, a pump (not shown) for delivering the first paste DP1 to the coating die 110, and the like. In the one side first undried layer forming process S11, a predetermined discharge amount of the first paste DP1 is discharged from the coating die 110 toward the main surface 32a of the positive electrode current collector foil 32 that is transported by the backup roller 120, and a belt-like coating film (the undried active material layer 33x) is continuously formed on the main surface 32a of the positive electrode current collector foil 32.

Subsequently, in "one side second undried layer forming process S12," before the undried active material layer 33x is heated and dried, the second paste DP2 is applied to the undried active material layer 33x using a spray coating device 200 (refer to FIG. 7), and an undried protective conductive layer 35x is formed. The spray coating device 200 includes a spray gun 210 for spraying and applying the second paste DP2 to the undried active material layer 33x, a pump (not shown) for delivering the second paste DP2 to the spray gun 210, and the like. In the one side second undried layer forming process S12, a predetermined spray amount of the second paste DP2 is sprayed from the spray gun 210 toward the undried active material layer 33x of the positive electrode current collector foil 32 in which the undried active material layer 33x is formed and which is transported by transport rollers 250 and 260, and a coating film (the undried protective conductive layer 35x) is continuously formed on the entire surface of the undried active material layer 33x.

Subsequently, in "one side simultaneous drying process S13," using a drying device 300 (refer to FIG. 7), the undried active material layer 33x and the undried protective conductive layer 35x on the main surface 32a of the positive electrode current collector foil 32 are simultaneously dried, and the active material layer 33 and the protective conductive layer 35 are formed. Specifically, the positive electrode current collector foil 32 in which the undried active material layer 33x and the undried protective conductive layer 35x are formed is transported into the drying device 300, hot air is blown to the undried protective conductive layer 35x, the undried protective conductive layer 35x and the undried active material layer 33x therebelow are heated and dried, and thus the protective conductive layer 35 and the active material layer 33 are formed. Therefore, a single-sided positive electrode plate 31y including the active material layer 33 and the protective conductive layer 35 on the main surface 32a of the positive electrode current collector foil 32 is formed.

Next, in "the other side first undried layer forming process S14," the first paste DP1 is applied to the other main surface 32b of the positive electrode current collector foil 32, and an undried active material layer 34x is formed. The other side first undried layer forming process S14 is performed using the die coating device 100 in the same manner as in the one side first undried layer forming process S11. Subsequently, in "the other side second undried layer forming process S15," before the undried active material layer 34x is heated and dried, the second paste DP2 is applied to the undried active material layer 34x, and an undried protective conductive layer 36x is formed. The other side second undried layer forming process S15 is performed using the spray coating device 200 in the same manner as in the one side second undried layer forming process S12. Subsequently, in "the other side simultaneous drying process S16," the undried active material layer 34x and the undried protective conductive layer 36x on the main surface 32b of the positive electrode current collector foil 32 are simultaneously dried, and the active material layer 34 and the protective conductive layer 36 are formed. The other side simultaneous drying process S16 is performed using the drying device 300 in the same manner as in the one side simultaneous drying process S13. Therefore, a positive electrode plate 31z including the active material layers 33 and 34 and the protective conductive layers 35 and 36 on both main surfaces 32a and 32b of the positive electrode current collector foil 32 is formed.

Next, in a "pressing process S17," the positive electrode plate 31z is pressed by a roll press machine (not shown), and the density of the active material layers 33 and 34 and the protective conductive layers 35 and 36 increases. Thus, the positive electrode plate 31 is produced.

In addition, separately, in the "negative electrode plate producing process S2," the negative electrode plate 51 is produced. Negative electrode active material particles (in Embodiment 1, graphite particles), a binding agent (in Embodiment 1, SBR) and a thickener (in Embodiment 1, CMC) are kneaded together with a dispersion medium (in Embodiment 1, water) in advance, and a negative electrode paste is prepared. Then, the negative electrode paste is applied to one main surface of the negative electrode current collector foil 52 by die coating, and an undried negative electrode active material layer (not shown) is formed, and then heated and dried to form a negative electrode active material layer (not shown). Similarly, a negative electrode paste is also applied to the other main surface of the negative electrode current collector foil 52, and an undried negative electrode active material layer (not shown) is formed and then heated and dried to form a negative electrode active material layer (not shown). Then, the negative electrode plate is pressed and the density of the negative electrode active material layer increases. Thus, the negative electrode plate 51 is produced.

Next, in the "electrode body forming process S3," the electrode body 20 is formed. Specifically, the belt-like positive electrode plate 31 and the belt-like negative electrode plate 51 are laminated with two belt-like separators 61 and 61 therebetween and wound around an axis using a winding core. Further, this is compressed into a flat shape and a flat wound type electrode body 20 is formed (refer to FIG. 2).

Next, in the "battery assembling process S4," the battery 1 is assembled. That is, the case lid member 13 is prepared, and the positive electrode terminal member 70 and the negative electrode terminal member 80 are fixed thereto (refer to FIG. 1 and FIG. 2). Then, the positive electrode terminal member 70 and the negative electrode terminal member 80 are welded to the positive electrode exposed part 31m of the positive electrode plate 31 and the negative electrode exposed part 51m of the negative electrode plate 51 of the electrode body 20. Next, the electrode body 20 is covered with the insulation film enclosure 19 and this is inserted into the case main body member 11, and an opening of the case main body member 11 is closed with the case lid member 13. Then, the case main body member 11 and the case lid member 13 are welded to form the battery case 10.

Next, in the "liquid injection process S5," the electrolytic solution 17 is injected into the battery case 10 from a liquid injection hole 13h, and impregnated into the electrode body 20. Then, the liquid injection hole 13h is sealed with a sealing member 15. Here, the liquid injection process S5 is performed under a dry environment of 25° C. and a dew point (DP) temperature of −30° C. or lower unlike processes of the positive electrode plate producing process S1 to battery assembling process S4, and then, in a "first charging process S6," the battery 1 is initially charged. The first charging process S6 is performed under an environment of 25° C., a humidity of 60%, and a dew point (DP) temperature of 16° C. like processes of the positive electrode plate producing process S1 to the battery assembling process S4. Then, various tests are performed on the battery 1. Thus, the battery 1 is completed.

As described above, the method of producing the positive electrode plate 31 (the positive electrode plate producing process S1) includes the one side first undried layer forming process S11, the one side second undried layer forming process S12, and the one side simultaneous drying process S13. Before the undried active material layer 33x is dried, the undried protective conductive layer 35x is formed on the undried active material layer 33x. Therefore, in the drying process, it is possible to reduce contact of the positive electrode active material particles 41 in the undried active material layer 33x with moisture and carbon dioxide in the atmosphere. In addition, the method includes the other side first undried layer forming process S14, the other side second undried layer forming process S15, and the other side simultaneous drying process S16. Before the undried active material layer 34x is dried, the undried protective conductive layer 36x is formed on the undried active material layer 34x. Therefore, in the drying process, it is possible to reduce contact of the positive electrode active material particles 41 in the undried active material layer 34x with moisture and carbon dioxide in the atmosphere. Therefore, in the producing process of the positive electrode plate 31, it is possible to reduce generation of lithium hydroxide on particle surfaces of the positive electrode active material particles 41, and additionally, generation of lithium carbonate, and change in a crystal structure on particle surfaces. Therefore, in the battery 1 using the positive electrode plate 31, compared to a battery using a positive electrode plate produced by a production method of forming the undried protective conductive layers 35x and 36x after the undried active material layers 33x and 34x are dried, it is possible to reduce an IV resistance.

Embodiment 2

Next, a second embodiment will be described. In the positive electrode plate 31 of the battery 1 of Embodiment 1, the moisture absorbent 47 is included in the protective conductive layers 35 and 36. On the other hand, a positive electrode plate 531 of a battery 500 of Embodiment 2 is different from that of Embodiment 1 in that no moisture absorbent is included in protective conductive layers 535 and 536.

That is, the positive electrode plate 531 of Embodiment 2 includes the same positive electrode current collector foil 32 as in Embodiment 1, and the same active material layer 33 as in Embodiment 1 is formed on the main surface 32a and the same active material layer 34 as in Embodiment 1 is formed on the other main surface 32b. In addition, also in Embodiment 2, the protective conductive layer 535 is formed on one active material layer 33 and the protective conductive layer 536 is formed on the other active material layer 34. However, these protective conductive layers 535 and 536 do not include a moisture absorbent, and include the conductive material 45, the binding agent 46, and the dispersant 48. Here, like Embodiment 1, regarding the conductive material 45, the binding agent 46, and the dispersant 48, AB is used as the conductive material 45, PVDF is used as the binding agent 46, and an anionic dispersant is used as the dispersant 48. In addition, a formulation ratio by weight between the conductive material 45, the binding agent 46, and the dispersant 48 is 30:6:1.

Here, the battery 500 of Embodiment 2 is produced in the same manner as in the battery 1 of Embodiment 1. That is, the positive electrode plate producing process S1 is performed, specifically, the one side first undried layer forming process S11, the one side second undried layer forming process S12, the one side simultaneous drying process S13, the other side first undried layer forming process S14, the other side second undried layer forming process S15, the other side simultaneous drying process S16, and the pressing process S17 are sequentially performed, and the positive electrode plate 531 is produced. However, in the one side second undried layer forming process S12 and the other side second undried layer forming process S15, regarding the second paste DP2, using a paste (a paste including the conductive material 45, the binding agent 46, and the dispersant 48) including no moisture absorbent 47, undried protective conductive layers 535x and 536x are formed. In addition, like Embodiment 1, the negative electrode plate producing process S2, the electrode body forming process S3, the battery assembling process S4, the liquid injection process S5 and the first charging process S6 are performed, and the battery 500 is produced.

In the positive electrode plate 531 of Embodiment 2, since the protective conductive layers 535 and 536 are provided on the active material layers 33 and 34, moisture and carbon dioxide in the atmosphere are unlikely to come in contact with the positive electrode active material particles 41 in the active material layers 33 and 34 when the positive electrode plate 531 is handled. Therefore, it is possible to reduce generation of lithium hydroxide and lithium carbonate on particle surfaces of the positive electrode active material particles 41 in the active material layers 33 and 34 due to contact with moisture and carbon dioxide and change in a crystal structure on particle surfaces. Therefore, in the battery 500 using the positive electrode plate 531, compared to a battery using a positive electrode plate having no protective conductive layers 535 and 536 on the active material layers 33 and 34, the positive electrode plate 531 in which an IV resistance of the battery 500 is reduced can be obtained. In addition, since the conductive material 45 is included in the protective conductive layers 535 and 536, compared to a positive electrode plate in which the conductive material 45 is not included in the protective conductive layers 535 and 536, the conductivity of the positive electrode plate 531 in the thickness direction GH can be improved. In addition, parts similar to those of Embodiment 1 exhibit the same actions and effects as those of Embodiment 1.

Examples and Comparative Examples

Next, results of tests performed to verify effects of the present disclosure will be described. The battery 500 of Embodiment 2 was prepared as Example 1 and the battery 1 of Embodiment 1 was prepared as Example 2. In addition, as the comparative example, a battery including a positive electrode plate (a positive electrode plate including only the positive electrode current collector foil 32 and the active material layers 33 and 34) having no protective conductive layer in the positive electrode plate 31 of Embodiment 1 was prepared. Parts other than the positive electrode plate were the same as those of the battery 1 of Embodiment 1.

Figure 8:
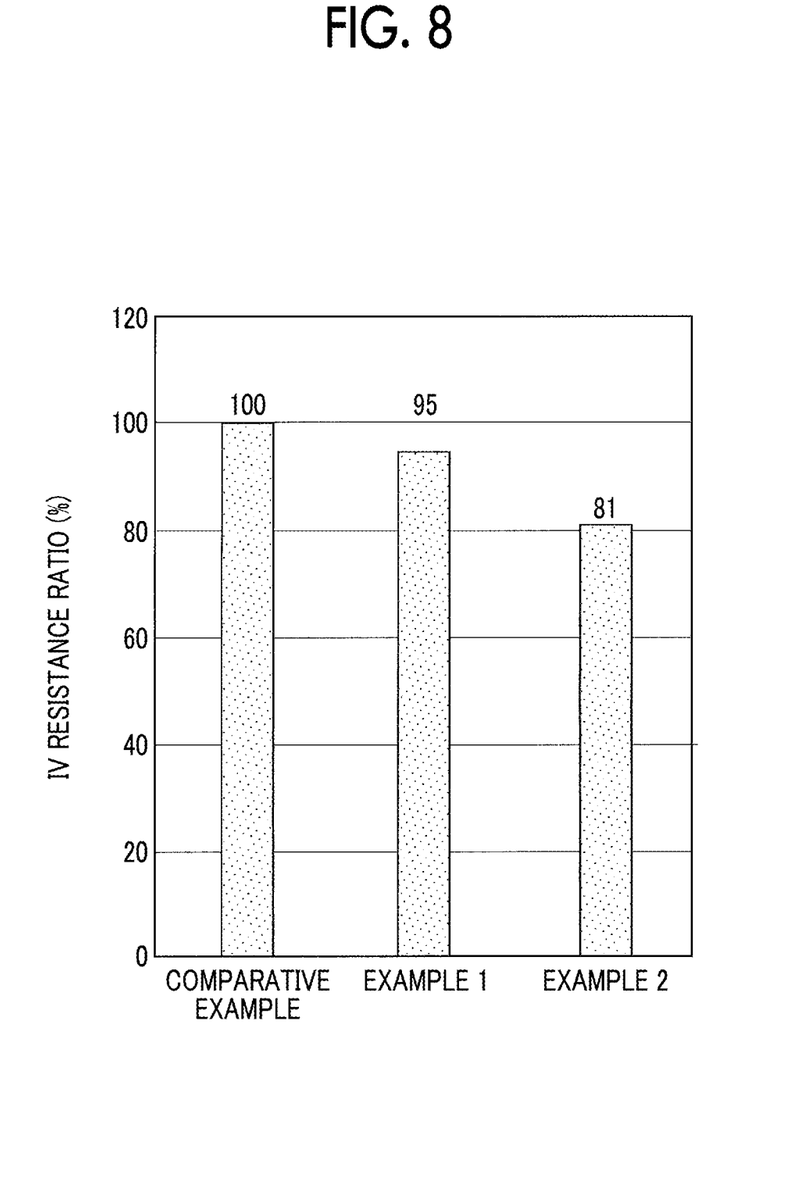
FIG. 8 is a graph showing IV resistance ratios of batteries according to Examples 1 and 2 and a comparative example.

Then, IV resistances R of batteries of Examples 1 and 2 and the comparative example were measured. Specifically, regarding batteries in which an SOC was adjusted to 50%, at an environmental temperature of 25° C., the batteries were discharged at a discharge current value I=5C for 5 seconds, and a battery voltage V1 when discharging was started and a battery voltage V2 after 5 seconds were measured. IV resistances R of the batteries were calculated according to R=(V1−V2)/I. In addition, an IV resistance value of the battery of the comparative example was set as a reference (=100%), and IV resistance ratios of Examples 1 and 2 were obtained. The results are shown in FIG. 8.

The battery 500 of Example 1 had a lower IV resistance ratio (95%) than the battery of the comparative example, and the battery 1 of Example 2 had a lower IV resistance (81%) than the battery 500 of Example 1. The reason for this is inferred to be as follows. That is, in the battery of the comparative example, the positive electrode active material particles 41 included in the active material layers 33 and 34 of the positive electrode plate came in contact with moisture in the atmosphere and reacted with water on particle surfaces of the positive electrode active material particles 41, and lithium hydroxide was generated ($Li_2O+H_2O \rightarrow 2LiOH$). In addition, the lithium hydroxide reacted with carbon dioxide in the atmosphere and lithium carbonate was generated ($2LiOH+CO_2 \rightarrow Li_2CO_3+H_2O$). Lithium carbonate generated on particle surfaces of the positive electrode active material particles 41 was a resistor. In addition, when the positive electrode active material particles 41 reacted with water and lithium ions were released from the positive electrode active material particles 41, a crystal structure of the positive electrode active material particles 41 changed and insertion and removal of lithium ions in the positive electrode active material particles 41 became difficult. In the battery of the comparative example using the positive electrode plate, an IV resistance R was thought to be higher for this reason.

On the other hand, in the batteries 1 and 500 of Examples 2 and 1, the protective conductive layers 35, 36, 535, and 536 are provided on the active material layers 33 and 34 of the positive electrode plates 31 and 531, and thus moisture and carbon dioxide in the atmosphere were unlikely to come in contact with the positive electrode active material particles 41 in the active material layers 33 and 34. Therefore, it is possible to reduce generation of lithium hydroxide on particle surfaces of the positive electrode active material particles 41 in the active material layers 33 and 34, and additionally, generation of lithium carbonate due to contact with moisture and carbon dioxide and change in a crystal structure on particle surfaces. Therefore, in the batteries 1 and 500 using the positive electrode plates 31 and 531, compared to a battery using a positive electrode plate having no protective conductive layers 35, 36, 535, and 536 on the active material layers 33 and 34, it was possible to reduce an IV resistance of the batteries 1 and 500. The batteries 1 and 500 of Examples 2 and 1 were thought to have a lower IV resistance ratio (lower IV resistance R) than the battery of the comparative example for this reason.

In addition, in the battery 1 of Example 2, since the moisture absorbent 47 was included in the protective conductive layers 35 and 36, even if the positive electrode plate 31 came in contact with moisture in the atmosphere, the moisture was absorbed by the moisture absorbent 47 in the protective conductive layers 35 and 36. Therefore, it was possible to reduce the amount of moisture that reached the active material layers 33 and 34 below the protective conductive layers 35 and 36. Therefore, it was possible to effectively reduce generation of lithium hydroxide on particle surfaces, and additionally, generation of lithium carbonate due to moisture in contact with the positive electrode active material particles 41 in the active material layers 33 and 34, and change in a crystal structure on particle surfaces. The battery 1 of Example 2 using the positive electrode plate 31 was thought to have a lower IV resistance ratio (lower IV resistance R) than the battery 500 of Example 1 for this reason.

While Embodiments 1 and 2 of the present disclosure have been described above, the present disclosure is not limited to Embodiments 1 and 2, and of course, it can be appropriately changed and applied without departing from the spirit and scope of the present disclosure. For example, in Embodiments 1 and 2, in the one side second undried layer forming process S12 and the other side second undried layer forming process S15, the undried protective conductive layers 35x and 36x are formed by spray coating, but a coating method is not limited thereto. For example, the undried protective conductive layers 35x and 36x can be formed by die coating and gravure coating.

What is claimed is:

1. A method of producing a positive electrode plate of a lithium ion secondary battery, the method comprising:
    forming an undried active material layer including positive electrode active material particles containing lithium composite oxide on a current collector foil;
    forming an undried protective conductive layer that does not include the positive electrode active material particles and includes a conductive material and a binding agent on the undried active material layer, wherein the undried protective conductive layer is formed by spray coating; and
    drying the undried active material layer and the undried protective conductive layer simultaneously and forming an active material layer and a protective conductive layer; wherein:
        the active material layer is disposed between the current collector foil and the protective conductive layer,
        the protective conductive layer includes a moisture absorbent; and
        the undried protective layer prevents contact of the positive electrode active material particles with water and carbon dioxide during the drying.

2. The method according to claim 1, wherein the moisture absorbent is a chemical moisture absorbent that absorbs water through a chemical reaction.

3. The method according to claim 2, wherein the moisture absorbent is an anhydrite powder.

4. The method according to claim 1, wherein the positive electrode active material particles, which are included in the active material layer, have a property in which a pH of a liquid dispersion in which 1 g of the positive electrode active material particles is dispersed in 49 g of water is 11.3 or more.

* * * * *